(12) United States Patent
Posa

(10) Patent No.: US 9,708,870 B2
(45) Date of Patent: Jul. 18, 2017

(54) SYSTEM AND METHOD FOR TREATING PRODUCED, DESALTED, AND FLOW BACK WATER

(71) Applicant: Richard Paul Posa, North Tonawanda, NY (US)

(72) Inventor: Richard Paul Posa, North Tonawanda, NY (US)

( * ) Notice: Subject to any disclaimer, the term of this patent is extended or adjusted under 35 U.S.C. 154(b) by 69 days.

(21) Appl. No.: 13/773,351

(22) Filed: Feb. 21, 2013

(65) Prior Publication Data

US 2013/0213893 A1    Aug. 22, 2013

Related U.S. Application Data

(60) Provisional application No. 61/601,806, filed on Feb. 22, 2012.

(51) Int. Cl.
*C02F 1/44* (2006.01)
*B01D 61/00* (2006.01)
(Continued)

(52) U.S. Cl.
CPC ............ *E21B 21/065* (2013.01); *C02F 1/004* (2013.01); *C02F 1/02* (2013.01); *C02F 1/20* (2013.01);
(Continued)

(58) Field of Classification Search
CPC ...... E21B 21/063; E21B 21/065; E21B 43/26; E21B 43/40; B01D 2311/04;
(Continued)

(56) References Cited

U.S. PATENT DOCUMENTS 2,778,777 A * 1/1957 Powell .................. C10G 17/06
                                                    204/567
3,450,632 A * 6/1969 Huval .................. B01D 17/045
                                                    210/318
(Continued)

FOREIGN PATENT DOCUMENTS

SU           1301945 A    4/1987
WO    WO 2010/068578    6/2010

OTHER PUBLICATIONS

Asatekin et al., Anti-fouling ultrafiltration membrane containing polyacrylonitrile-graft-poly(ethylene oxide) comb copolymer additives, 298 J. Membr. Sci. 136, 136-146 (2007).*
(Continued)

*Primary Examiner* — Krishnan S Menon
(74) *Attorney, Agent, or Firm* — Simpson & Simpson, PLLC

(57) ABSTRACT

A system adapted to condition an initial water feed stream into a treated water stream and to discharge the treated water stream. The initial water feed stream includes at least one of: a plurality of particles; an oil; a volatile organic compound; a hydrogen sulfide; a non-volatile compound; a heavy metal; and, a dissolved ion. The system includes a particle and oil removal subsystem adapted to form a first partial treated water stream, a chemical oxygen demand reduction subsystem adapted to form a second partial treated water stream, and a heavy metal and dissolved ion removal subsystem adapted to form a treated water stream.

29 Claims, 5 Drawing Sheets

(51) Int. Cl.
*C02F 1/28* (2006.01)
*E21B 21/06* (2006.01)
*C02F 9/00* (2006.01)
*E21B 43/26* (2006.01)
*E21B 43/40* (2006.01)
*C02F 1/00* (2006.01)
*C02F 1/02* (2006.01)
*C02F 1/20* (2006.01)
*C02F 101/10* (2006.01)
*C02F 101/20* (2006.01)
*C02F 101/32* (2006.01)
*C02F 103/08* (2006.01)
*C02F 103/10* (2006.01)

(52) U.S. Cl.
CPC ............ *C02F 1/28* (2013.01); *C02F 1/441* (2013.01); *C02F 1/442* (2013.01); *C02F 9/00* (2013.01); *E21B 43/26* (2013.01); *E21B 43/40* (2013.01); *C02F 2101/101* (2013.01); *C02F 2101/108* (2013.01); *C02F 2101/20* (2013.01); *C02F 2101/322* (2013.01); *C02F 2103/08* (2013.01); *C02F 2103/10* (2013.01); *C02F 2303/08* (2013.01); *C02F 2303/16* (2013.01); *C02F 2303/24* (2013.01)

(58) Field of Classification Search
CPC ............ B01D 2311/06; B01D 17/0202; B01D 17/0214; B01D 17/0208; B01D 17/045; B01D 17/08; B01D 2311/2623; B01D 2311/2642; B01D 2311/26495; C02F 1/004; C02F 1/02; C02F 1/20; C02F 1/28; C02F 1/441; C02F 1/442; C02F 2101/101; C02F 2101/108; C02F 2101/322; C02F 2103/322; C02F 2103/08; C02F 2103/10; C02F 2303/08; C02F 2303/16; C02F 2303/24; C02F 9/00; C02F 2101/20
USPC ....... 210/259, 180, 188, 202, 650, 651, 652, 210/669, 78, 710, 749, 750, 797, 799, 210/806
See application file for complete search history.

(56) References Cited

U.S. PATENT DOCUMENTS

| | | | |
|---|---|---|---|
| 3,536,618 A | 10/1970 | Urban et al. | |
| 3,536,619 A | 10/1970 | Urban et al. | |
| 3,844,942 A | 10/1974 | Barber | |
| 3,913,673 A | 10/1975 | Barber | |
| 4,412,924 A | 11/1983 | Feather | |
| 4,428,841 A | 1/1984 | Favret, Jr. | |
| 4,436,635 A | 3/1984 | Abrams et al. | |
| 4,761,209 A | 8/1988 | Bonaventura et al. | |
| 4,872,991 A | 10/1989 | Bartels et al. | |
| 5,470,478 A | 11/1995 | Leva | |
| 5,935,444 A | 8/1999 | Johnson et al. | |
| 6,136,144 A * | 10/2000 | Martin et al. | 162/14 |
| 6,143,553 A * | 11/2000 | Teller | 435/266 |
| 6,183,646 B1 * | 2/2001 | Williams et al. | 210/636 |
| 6,235,201 B1 | 5/2001 | Smith et al. | |
| 6,398,966 B1 | 6/2002 | Smith et al. | |
| 6,409,924 B1 | 6/2002 | Johnson et al. | |
| 7,491,336 B2 | 2/2009 | Markham et al. | |
| 7,520,993 B1 | 4/2009 | Laraway et al. | |
| 7,556,739 B1 | 7/2009 | Johnston-Dhuet et al. | |
| 7,879,245 B2 | 2/2011 | Markham et al. | |
| 7,963,338 B1 | 6/2011 | Bader | |
| 8,097,163 B1 | 1/2012 | Stewart et al. | |
| 8,449,656 B2 | 5/2013 | Wu et al. | |
| 2002/0012622 A1 * | 1/2002 | Frondorf | B01D 53/1418 423/228 |
| 2003/0155301 A1 | 8/2003 | Silva et al. | |
| 2007/0102359 A1 * | 5/2007 | Lombardi | B01D 17/085 210/639 |
| 2008/0035586 A1 | 2/2008 | Chen et al. | |
| 2008/0105620 A1 | 5/2008 | Hicks | |
| 2010/0096342 A1 * | 4/2010 | Roberts | 210/777 |
| 2010/0218946 A1 | 9/2010 | Symington et al. | |
| 2010/0282592 A1 | 11/2010 | Elgat et al. | |
| 2011/0042288 A1 | 2/2011 | Chen et al. | |
| 2011/0253634 A1 * | 10/2011 | Soane | C02F 1/28 210/680 |

OTHER PUBLICATIONS

Mukul Sharma, Water in Hydraulic Fracturing: Challenges and Opportunities 1-47 (2011).*

Dowex P4roduct information: Optipore L493 and V493 polymeric adsorbents, date unknown.* http://www.liquicel.com/uploads/documents/TB%2088%20Liqui-Cel%20Contactor%20Feasibility%20Testing%20at%20RO%20Solutions.pdf (file created Nov. 5, 2013).

* cited by examiner

SYSTEM AND METHOD FOR TREATING PRODUCED, DESALTED, AND FLOW BACK WATER

CROSS-REFERENCE TO RELATED APPLICATIONS

This patent application claims the benefit under 35 U.S.C. §119(e) of U.S. Provisional Patent Application No. 61/601,806, filed Feb. 22, 2012, which application is incorporated herein by reference.

TECHNICAL FIELD

The presently disclosed embodiments are directed to a system and method for treating produced and flow back water and wastewater from processes such as desalting associated with recovery of crude oil and natural gas from reservoirs and the preparation of water to be used for enhanced oil recovery (EOR) and other requirements such as desalting and hydrofracturing.

BACKGROUND

Petroleum, also commonly referred to as oil, consists of a complex mixture of hydrocarbons of various molecular weights, plus other organic compounds. Petroleum is a naturally occurring liquid found in rock formations. It is generally accepted that oil is formed mostly from the carbon rich remains of ancient plankton after exposure to heat and pressure in the Earth's crust over hundreds of millions of years gradually transforming into oil and natural gas reservoirs. Petroleum is a vital component of the world's supply of energy as a source of providing heating and electricity. It is also used as fuel for vehicles when refined, and as a chemical feedstock in the manufacture of plastics and other commercially important organic chemicals. Worldwide consumption of oil is approximately thirty billion barrels (4.8 $km^3$) per year, with developed nations being the largest consumers. For example, the United States consumed about 25% of the oil produced in 2007. Petroleum is found in deep underground natural rock formations and may be associated with other hydrocarbons such as natural gas.

Oil reservoirs may be located deep within the Earth's crust. As recovery technology advances, oil recovery methods are being performed in deeper locations within the Earth, most notably in offshore and deep ocean locations. For example, deep ocean drilling rigs are now drilling in water depths at or in excess of 2,000 meters. Similarly, there is much activity at land based locations.

Oil recovery may take a variety of forms and methods. For example, once a reservoir is identified, an oil well is created by drilling a long hole into the Earth. A steel pipe, known as a casing, is placed in the hole to provide structural integrity to the newly drilled well bore. Holes are then made in the base of the well to enable oil to pass into the bore, which oil is then removed by various methods. Typically, recovered oil includes various other secondary byproducts such as natural gas, inorganic compounds and water associated with it. As wells mature, various techniques are employed to extract as much oil as possible. These techniques are commonly referred to as enhanced oil recovery (EOR). One of these techniques injects treated water into a reservoir to displace the oil. This technique requires that the water is of specific quality which necessitates treatment prior to injection. Another technology being used to recover previously unrecovered oil is hydraulic fracturing. This is a technique used to create fractures in rock with a hydraulic fluid, typically water with additives, under high pressure to release trapped hydrocarbons.

Crude primary treatment techniques may comprise multistep processes. For example, a technique may include first separating byproducts from raw crude oil, followed by desalting the crude oil. The byproducts and the raw crude are separated in a device called a separator or dehydrator which removes water. There are several types of separators depending on the feed stream and the separation objectives. Crude oil, natural gas, produced water, bottom sludge which is typically sand, and other inert compounds are separated. The oil is then washed with water to remove the salts that are trapped within the crude oil, i.e., desalting. The washing removes salts and generates a wastewater stream that contains dissolved salts, suspended material, oil, benzene, ethylbenzene, toluene and xylenes (BETX), and in some cases heavy metals.

Typical crude oil separation methods generate substantial quantities of waste. Such systems can generate from as little as 5,000 barrels per day (BPD) to upwards of 300,000 BPD. Waste water is generated from the water associated with the recovered hydrocarbons as well as water used to desalt the crude oil. The characterization of the water will vary according to its content. As oil and gas production wells mature, there is an increased percentage of produced water being generated. Produced water limits the capacity of crude oil transportation by corroding conveyance systems.

Regulations related to discharge of produced water vary by the authorities involved and the location receiving the waste stream. Table 1 represents typical waste water stream and associated regulatory discharge levels.

TABLE 1

| Constituent | PPM Range (unless otherwise noted) | Typical Discharge limits - PPM (unless otherwise noted) |
|---|---|---|
| Free Oil & grease | 100-1000 | <15 |
| BOD | 100-2000 | 150 |
| COD | 1000-5000 | Varies |
| Temperature | 25-200 deg. C. | 40 deg. C. |
| Hydrogen Sulfide | 0-100 | |
| Ph | 6-8 | Varies |
| TDS | 50,000-300,000 | Varies - platform deep ocean dilution |
| TSS | 100-1000 | 150 |
| Ammonia | 0-100 | |
| Sulfates | 500-5000 | |
| Heavy Metals | 10-200 | Varies by metal <1.5 |
| Silica | 100-2000 | |
| Sodium | 30,000+ | |
| Chloride | 30,000+ | |
| Hardness | 1000+ | |
| Iron | 10-100 | |
| Mercury | 1-10 | 0.01 |
| Oxygen | 5-10 | |

As the amount of crude oil recovered increases and additional water based enhanced techniques are used, the amount of produced water generated also increases, thereby creating serious environmental challenges to be addressed. Issues such as the contamination of water ways such as stream, lakes, groundwater with water containing, oil, grease, hydrocarbons, metals, etc., must be prevented, some of which contaminants result in increased levels of chemical oxygen demand (COD) and biochemical oxygen demand (BOD). Moreover, typical produced water is extremely high in total dissolved solids (TDS), sometime ten times that of sea water. TDS can destroy streams, lakes and groundwater by raising salinity levels. Furthermore, EOR techniques consume large quantities of water. For example, recovery of hydrocarbons consumes substantial quantities of fresh water for production activities. As oil recovery activities from reservoirs mature and EOR activities increase, scarce water resources are taxed at an increasing rate. Hydrofracturing activities require water treated to specific criteria. Once the well is fracked, there is substantial water that is removed from the well. This is called flowback and must be treated in a similar fashion to produced water.

Various known methods of treating produced water are presently utilized. For example, produced water is sent through separate conveyance lines or combined with oil and transported to shore for treatment. Additionally, produced water is injected back into deep wells; however, this sometimes results in the water reentering the oil reserves thereby creating further problems. Moreover, produced water is treated with conventional technologies that are large, heavy and generate substantial quantities of sludge while consuming large amounts of chemicals. Often the resulting sludge is not recoverable into commercial products and must be disposed of in a land fill.

The foregoing options for treating produced water suffer from the various defects described above, e.g., expensive, complex, difficult to clean, etc. The present system and method for treating produced water provides a variety of benefits that have heretofore been lacking in known systems. For example, the present system and method recovers hydrocarbons for commercial value while treating the water for total suspended solids (TSS), oil, metals, $H_2S$, BOD and other undesirable components. The present invention is sufficiently flexible to treat different produced water streams and can accommodate changes in those streams that may occur during operation. The present system has a small foot print and minimum weight. The present system and method generates minimum secondary waste and solids while being simple and easy to operate. The present invention requires minimum consumables and chemicals while producing treated water of a quality that allows for reuse or discharge. The present invention provides water for EOR, desalting, hydrofracturing and other production activities wherein the water is treated for the removal of contaminants such as sulfates, barium, boron, total dissolved solids, suspended solids, $H_2S$ and oxygen, and agents such as biocides are added to prevent sulfate reducing bacteria from reducing sulfates to hydrogen sulfide ($H_2S$), for example as need in EOR use. The present invention provides secondary waste streams from EOR operations that meet or exceed discharge standards.

SUMMARY

Broadly, the present invention discussed infra provides a system adapted to condition an initial water feed stream into a treated water stream and to discharge the treated water stream. The initial water feed stream includes at least one of: a plurality of particles; an oil; a volatile organic compound; a hydrogen sulfide; a non-volatile compound; a heavy metal; and, a dissolved ion. The system includes a particle and oil removal subsystem adapted to treat the initial water feed stream to remove the plurality of particles and the oil to form a first partial treated water stream, a chemical oxygen demand reduction subsystem adapted to treat the first partial treated water stream to remove the volatile organic compound, the hydrogen sulfide and/or the non-volatile organic compound to form a second partial treated water stream, and further includes a heavy metal and dissolved ion removal subsystem adapted to treat the second partial treated water stream to remove the heavy metal and the dissolved ion to form a treated water stream.

In some embodiments, the particle and oil removal subsystem includes at least one of: a gross particle filter adapted to treat the initial water feed stream to remove the plurality of particles; an oil coalescer unit adapted to treat the initial water feed stream to remove the oil; a fine particle filter adapted to treat the initial water feed stream to remove the plurality of particles; and, an oil removal membrane unit adapted to treat the initial water feed stream to remove the oil. In some embodiments, the chemical oxygen demand reduction subsystem includes at least one of: a stripping unit adapted to treat the first partial treated water stream to remove the volatile organic compound and the hydrogen sulfide and to form a vapor phase comprising the volatile organic compound and the hydrogen sulfide; and, a hydrocarbon polishing unit adapted to treat the first partial treated water stream to remove the non-volatile organic compound. In some embodiments, the chemical oxygen demand reduction subsystem includes the stripping unit, and further includes at least one of: a bio scrubber unit adapted to metabolize the volatile organic compound and the hydrogen sulfide of the vapor phase; and, a flare or a thermal oxidizer adapted to combust the volatile organic compound and the hydrogen sulfide of the vapor phase. In some embodiments, the heavy metal and dissolved ion removal subsystem includes at least one of: a heavy metal and dissolved ion removal unit adapted to treat the second partial treated water stream to adsorb the heavy metal and the dissolved ion and to form a plurality of adsorbed heavy metals and a plurality of adsorbed dissolved ions; a heavy metal and dissolved ion precipitation unit adapted to precipitate the plurality of adsorbed heavy metals as a plurality of insoluble metal hydroxides and the plurality of adsorbed dissolved ions as a plurality of insoluble compounds; and, a filter press adapted to form at least one cake comprising the plurality of insoluble metal hydroxides and the plurality of insoluble compounds.

In some embodiments, the present invention system is further adapted to prepare the treated water stream for an enhanced oil recovery operation, the treated water stream including at least one of: a sulfate; a hardness; a dissolved solid; and, an oxygen. In those embodiments, the system further includes a water reuse subsystem adapted to treat the treated water stream to remove the sulfate, the hardness, the dissolved solid and/or the oxygen to form an enhanced oil recovery feed stream. In some embodiments, the water reuse subsystem includes at least one of: a sulfate and hardness removal membrane unit adapted to treat the treated water stream to remove the sulfate and the hardness; a high pressure reverse osmosis unit adapted to treat the treated water stream to remove the dissolved solid; an oxygen removal unit adapted to treat the treated water stream to remove the oxygen; and, an oxygen scavenger feeder adapted to blend an oxygen scavenger and the treated water stream.

In some embodiments, the present invention system further includes a water cleaning subsystem adapted to treat an unconditioned cleaning water feed stream to remove a plurality of particles to form a conditioned cleaning water feed stream, wherein the conditioned cleaning water feed stream is used by at least one of: the particle and oil removal subsystem; the chemical oxygen demand reduction subsystem; and, the heavy metal and dissolved ion removal subsystem. In some embodiments, the water cleaning subsystem includes at least one of: a gross particle filter adapted to treat the unconditioned cleaning water feed stream to remove the plurality of particles; and, a fine particle filter adapted to treat the unconditioned cleaning water feed stream to remove the plurality of particles. In some embodiments, the unconditioned cleaning water feed stream includes ocean water or a fresh water source.

According to aspects illustrated herein, there is provided a method for conditioning an initial water feed stream into a treated water stream. The initial water feed stream includes at least one of: a plurality of particles; an oil; a volatile organic compound; a hydrogen sulfide; a non-volatile compound; a heavy metal; and a dissolved ion. The method includes: a) treating the initial water feed stream to remove the plurality of particles and the oil to form a first partial treated water stream; b) treating the first partial treated water stream to remove the volatile organic compound, the hydrogen sulfide and/or the heavy metal to form a second partial treated water stream; and, c) treating the second partial treated water stream to remove the heavy metal to for the treated water stream.

In some embodiments, the step of treating the produced water feed stream is performed using at least one of: a gross particle filter adapted to treat the initial water feed stream to remove the plurality of particles; an oil coalescer unit adapted to treat the initial water feed stream to remove the oil; a fine particle filter adapted to treat the initial water feed stream to remove the plurality of particles; and, an oil removal membrane unit adapted to treat the initial water feed stream to remove the oil. In some embodiments, the step of treating the first partial treated water stream is performed using at least one of: a stripping unit adapted to treat the first partial treated water stream to remove the volatile organic compound and the hydrogen sulfide and to form a vapor phase comprising the volatile organic compound and the hydrogen sulfide; and, a chemical oxygen demand polishing unit adapted to treat the first partial treated water stream to remove the non-volatile organic compound. In some embodiments, the step of treating the first partial treated water stream is performed using the stripping unit and at least one of: a bio scrubber unit adapted to metabolize the volatile organic compound and the hydrogen sulfide of the vapor phase; and, a flare or a thermal oxidizer adapted to combust the volatile organic compound and the hydrogen sulfide of the vapor phase. In some embodiments, the step of treating the second partial treated water stream is performed using at least one of: a heavy metal and dissolved ion removal unit adapted to treat the second partial treated water stream to adsorb the heavy metal and the dissolved ion and to form a plurality of adsorbed heavy metals and a plurality of adsorbed dissolved ions; a heavy metal and dissolved ion precipitation unit adapted to precipitate the plurality of adsorbed heavy metals as a plurality of insoluble metal hydroxides and the plurality of adsorbed dissolved ions as a plurality of insoluble compounds; and, a filter press adapted to form at least one cake comprising the plurality of insoluble metal hydroxides and the plurality of insoluble compounds.

In some embodiments, the treated water stream includes at least one of: a sulfate; a hardness; a dissolved solid; and, an oxygen, and the method further includes: d) treating the treated water stream to remove the sulfate, the hardness, the dissolved solid and/or the oxygen to form an enhanced oil recovery feed stream. In some embodiments, the step of treating the treated water stream is performed using at least one of: a sulfate and hardness removal membrane unit adapted to treat the treated water stream to remove the sulfate and the hardness; a high pressure reverse osmosis unit adapted to treat the treated water stream to remove the dissolved solids; an oxygen removal unit adapted to treat the treated water stream to remove the oxygen; and, an oxygen scavenger feeder adapted to blend an oxygen scavenger and the treated water stream.

In some embodiments, the method further include: treating an unconditioned cleaning water feed stream to remove a plurality of particles to form a conditioned cleaning water feed stream, wherein the conditioned cleaning water feed stream is used in at least one of: steps a), b) and c). In some embodiments, the step of treating an unconditioned cleaning water feed stream is performed using at least one of: a gross particle filter adapted to treat the unconditioned cleaning water feed stream to remove the plurality of particles; and, a fine particle filter adapted to treat the unconditioned cleaning water feed stream to remove the plurality of particles. In some embodiments, the unconditioned cleaning water feed stream includes ocean water or a fresh water source.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
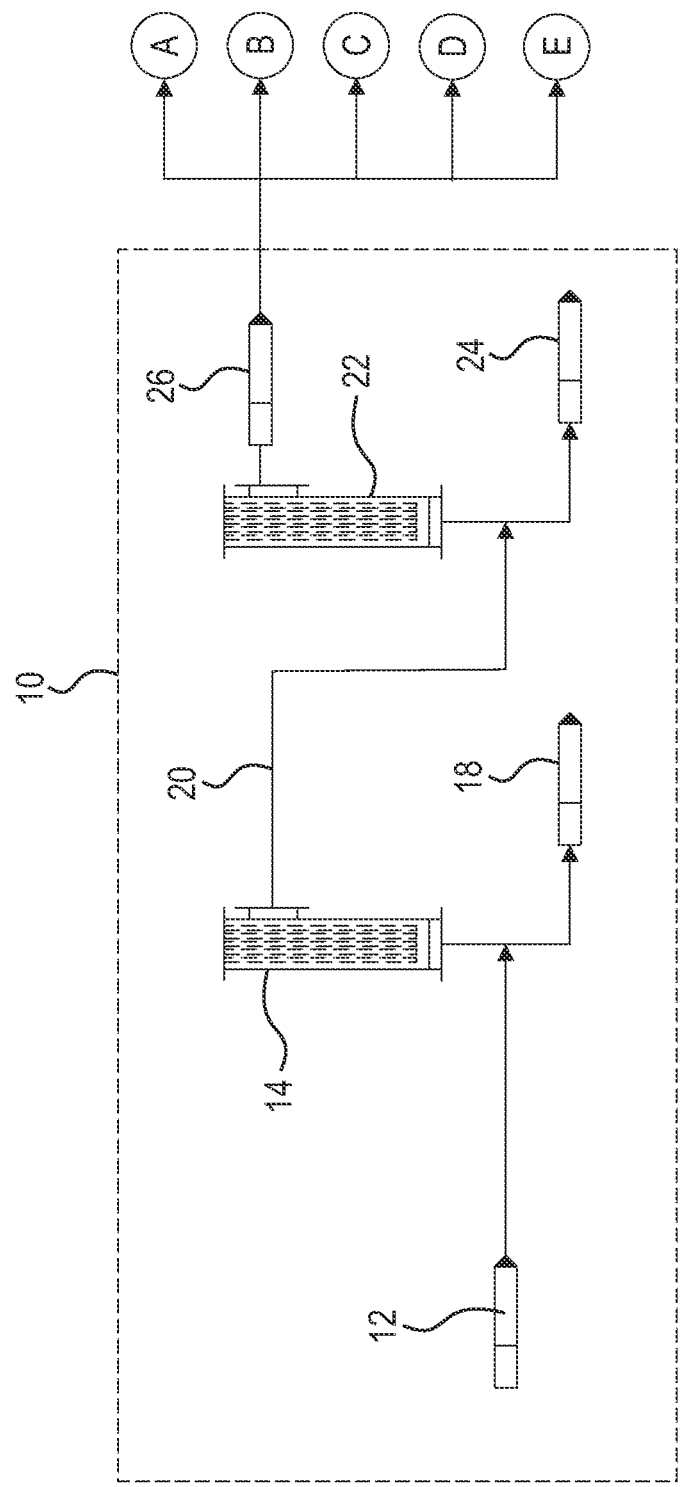
FIG. 1 is a first portion of a schematic diagram of a present invention system for treating produced water showing a clean water production subsystem.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, the term "average" shall be construed broadly to include any calculation in which a result datum or decision is obtained based on a plurality of input data, which can include but is not limited to, weighted averages, yes or no decisions based on rolling inputs, etc. The term "produced water", as used herein, is intended to mean water that is produced when oil and gas are extracted from the ground. Oil and gas reservoirs have a natural water layer, i.e., formation water, that lies under the hydrocarbons. Oil reservoirs frequently contain large volumes of water, while gas reservoirs tend to have smaller quantities. To achieve maximum oil recovery additional water is often injected into the reservoirs to help force the oil to the surface. Both the formation water and the injected water are eventually produced along with the oil and therefore as the field becomes depleted the produced water content of the oil increases. Additionally, "produced water" is intended to include water commonly known as flow back water used in hydrofracturing operations, as well as water used in desalting operations. Furthermore, as used herein, the phrase "to treat . . . to remove" is intended to mean performing an operation on a component to remove all or some of a constituent within the component, wherein the extent of partial removal is further described infra, while the phrase "to treat . . . to adsorb" is intended to mean performing an operation on a component to adsorb all or some of a constituent within the component, wherein the extent of partial adsorption is further described infra.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

Broadly, the present invention recovers hydrocarbons of commercial value by limiting use of chemicals that would prevent such recovery. The present invention treats produced water for TSS, oil, metals, $H_2S$, BOD, COD and other contaminates that would prevent discharge of the treated water to the environment. The present invention is flexible in that it can be adjusted as needed to treat different streams and changes within a given stream. The present invention has a small foot print with minimum weight when compared to known systems of gravity and induced gas separation, nut shell filtration, metals precipitation, and biological treatment. The present invention causes minimum secondary and solids waste generation, while utilizing a minimum amount of consumables and chemicals. The present invention produced treated water of a quality that allows for reuse and/or discharge. Additionally, the present invention provides water for EOR, desalting, hydrofracturing or other production clean water requirements where the water is treated for the removal of sulfates, suspended solids, dissolved solids, $H_2S$, and oxygen, while agents such as biocides are added to prevent sulfate reducing bacteria from reducing sulfates to hydrogen sulfide ($H_2S$) where required.

The present system and method broadly comprises: filtration pretreatment; hydrocarbon removal; volatile organic compound (VOC) and $H_2S$ removal; metals and specific ion contaminate removal; solids dewatering; and, discharge. In some embodiments, the present invention may also prepare water for use in EOR, clean water production uses or hydrofracturing, and thus may broadly comprise: nano filtration; low and high pressure reverse osmosis; and, degasification.

Filtration Pretreatment

The present invention comprises a two step, high rate, compact filtration stage. The first step provides for crude filtration for sand and solids removal while the second step removes finer particles that may cause fouling of oil recovery membranes or reduced recovery rates. The second step is performed after the primary oil recovery step. Crude filtration is performed in using a gross particle filter, while fine filtration is performed in a fine particle filter. Both filtration steps may include a pneumatic assist for water flush cleaning. Filtration media types and sizes are adjusted as required for process optimization. The first filtration step may be a slotted duplex stainless steel wedge wire with openings of 200 microns to remove fine sand. After the water leaves the primary oil separation device any entrained particles will be removed by the polishing filter using a 20 micron cleanable filter cloth media made from Teflon®. Pneumatic gas assist is used to dislodge any sticky material from the filter surface. A cleaning water stream is returned to a dehydrator, i.e., an upstream system forming part of the crude oil processing system, wherein oil recovery is accomplished, or the cleaning water stream can be sent to a stilling tank for separation of oil and solids. The solids can then be sent to a dewatering system, such as a J-Press® filter press sold by Siemens located in Alpharetta, Ga.

Hydrocarbon Removal

The present invention comprises a two step process for the efficient removal of the majority of hydrocarbons present in the produced water stream. This inventive process is highly efficient within a small foot print or surface area consumed. Hydrocarbons are recovered for commercial use since chemicals are not used that would prevent recovery and use of oil. It should be appreciated that the present two step process allows for high recoveries, typically in excess of 95%.

The first step of the hydrocarbon removal stage comprises the primary oil separation and recovery operation. This step utilizes a vessel filled with a resin bead packing that attracts fine oil droplets on its surface. As the droplets grow in size, they release and float to the top of vessel. The layer of oil forming at the top of the vessel is removed and recovered for commercial value. Recovery of oil can be as high as 95% with residual oil of less than 5 parts per million (PPM) in the water stream. In view of the efficiency of the resin separator system, the water exiting the separator can be directly discharged to the environment where conditions allow. However, it should be appreciated that whether the water is directly discharged or further processed is based on the quality of the feed stream and the discharge standards for the application or location.

The resin separator system can be run at higher temperatures, e.g., 70° C. or higher, to prevent paraffin and asphaltene from coating the vessel or resin beads. The high surface area afforded by the resin beads permits the overall size of the separator system to be relatively small and light weight. The separator system may comprise one or more vessels, and the feed stream may be introduced under pressure or gravity fed through the separator. Moreover, the feed stream may flow upwardly or downwardly through the separator. The present resin separator system permits fouled media, i.e., fouled resin beads, to be cleaned in place or removed for external cleaning. Cleaning is accomplished by up flow fluidizing the resin bed and/or the addition of hot water to remove waxes and particulates. The layer of oil forming at the top of the vessel is removed and recovered for commercial value.

The second step of the hydrocarbon removal stage, also referred to as the oil removal stage, comprises at least one membrane separation operation. It should be appreciated that the filtration pretreatment stage and primary oil recovery stage increase and/or optimize the performance of the membrane separation operation. The membranes used in the second step of the hydrocarbon removal stage remove the balance of free oil and additional hydrocarbons such as BETX compounds from the feed stream. The foregoing is accomplished by allowing oil to build up to over 1,000 PPM within the membrane. As oil levels increase within the membrane, additional hydrocarbons are removed thus decreasing the BOD and COD load on additional treatment devices and providing for the additional recovery of hydrocarbons.

Suitable membranes may be selected from but not limited to hydrophilic membranes, polyacrylonitrile (PAN) polymer, polyvinylidene fluoride (PVDF) and polyvinyl chloride (PVC). Membranes having pore sizes between 0.01-0.05 microns with an approximate molecular weight cutoff between 10K-60K Daltons are suitable for use in the present invention. It should be appreciated that suitable membranes are hydrophilic which attract water and repel oil, and the level of hydropholicity may be specifically selected based on the requirements of the membrane separation operation. The hydrophilic characteristic of the membrane allows for low tangential surface velocities thereby saving on pumping horse power. Some membranes, e.g., PVDF, can be run at hot temperatures, i.e., 70° C. or higher, to prevent paraffin and asphaltene from coating the membranes. These membranes are design so that TDS will not be affected by the process. In short, by minimizing rejection of TDS, low pressure and high flux rate can be achieved through the membranes without introducing scaling issues.

VOC and $H_2S$ Removal

The VOC and $H_2S$ removal stage comprises air stripping of these components using conventional, known techniques. For example, the water feed stream flows down though packaging material or a series of trays while air is introduced via a counter current up flow. This arrangement removes a substantial amount of VOCs and $H_2S$ from the water feed stream thereby reducing the load to the final semi volatile organic compound (SVOC) removal device. It should be appreciated that a tray type air stripper as described is compact in size and provides VOC and $H_2S$ removal to acceptable levels. Other gas/liquid contacting devices known in the art may be utilized for the VOC and $H_2S$ removal stage, e.g., columns with random or structured packing.

In some embodiments, the air stripping device may comprise a biogas filter adapted to destroy VOCs and $H_2S$ in the off gas from the stripper, thus permitting direct air discharge as the exiting air stream meets acceptable air discharge standards. In some embodiments, the biogas filter uses a high surface ceramic media that is hydrophilic. The media provides high surface area and flow throughput for the air, which provides increased contact with bacteria specifically selected to destroy, in an aerobic process, VOCs using chemoheterotophic bacteria and $H_2S$ using sulfur-oxidizing bacteria. Biofilters are reactors in which waste gases are allowed to pass through a porous packed bed material immobilized with suitable microbial cultures. As the waste gas passes through the filter medium, the contaminants in the gas transverse to the liquid phase surrounding the microbial biofilm in the media. The contaminants are subsequently converted to $CO_2$, $H_2O$, $SO_4$, inorganic salts and biomass by microorganisms. The high surface area of the media permits the unit to have a small overall footprint and low weight.

In some embodiments, a final oil recovery step may comprise passing the feed stream through a specially design adsorptive resin or granular activated carbon which adsorb final traces of hydrocarbons. Such resins, e.g., macroporous styrene-DVB, and activated carbon have a high infinity for organic compounds and thus readily adsorb organic compounds. Depending on the concentration of and types of hydrocarbons and the desire to recover additional organic compounds, the foregoing oil recovery unit can be in upstream or downstream of the air stripper described above. The final oil recovery unit may be regenerated with steam to desorb hydrocarbons and any captured hydrocarbons can be recovered therefrom. Typically, the foregoing media, i.e., resins and/or activated carbon, are held in pressure vessels in various series and/or parallel configurations as required by particular system needs.

Heavy Metals Ion and Dissolved Specific Ion Contaminates Removal

Produced water typically comprises various types of heavy metals and/or other dissolved contaminate ions that have restrictions for discharge, e.g., lead, copper, cadmium, mercury, strontium and barium. Specific resins used for the removal of metals and other dissolved ion contaminants, e.g., boron, are designed to work in concentrated brine salt streams, e.g., macroporous styrene divinylbenzene with iminodiacetic acid functional groups and a macroreticular polymer with thiol functional groups. For boron contaminants, a N-methylglucimine functional group can be used. Typically, the foregoing media, i.e., resins, are held in pressure vessels in various series and/or parallel configurations as required by particular system needs. In view of inherent resin properties, metals and dissolved specific ion contaminates can be removed from the produced water stream and then during resin regeneration using acids and hydroxides, a very concentrated stream of metals and contaminates can be generated. The metals in the regeneration stream can be precipitated using hydroxide which is added to adjust the pH of collected solution to the appropriate range for heavy metal precipitation as insoluble metal hydroxides along with other insoluble contaminates. Heavy metal precipitates may be subsequently dewatered into a cake as described infra. Other chemistry which is common to the art can be used and additives such as filtering acids can be used. The present invention process is very efficient relative to conventional precipitation clarification processes, and generates far less sludge while maintaining a smaller overall footprint. After removal of heavy metal ions, the resulting water can be further treated with the addition of an oxidizing agent to remove traces of BOD, COD and $H_2S$. Examples of oxidizing agents can include but are not limited to, chlorine, ozone and peroxide, which agents can be generated locally or supplied from an outside source.

Solids Dewatering

A reaction tank, reactor mixer, polymer, chemical feed for pH adjustment and filter press is included in the present system for precipitation of solids and removal of water prior to transportation to a disposal location. The reaction tank in combination with the filter press can also be used for dewatering solids from filtration stages describe supra.

Discharge

One benefit of the present invention is that water from the process can be directly discharged to an ocean or other body of water. If the TDS level or temperature is not within discharge requirements, the wastewater is discharged below surface, and depending on the wastewater chemistry, discharged in a deep distribution/dilution pipeline or deep well waste injection.

Preparation for Water for Injection for Enhanced Oil Recovery, for Desalting Feed Water and/or for Hydrofracturing (Optional)

One of the aspects of the present invention is that water from a fresh water or seawater treatment system can be fed directly to this subsystem for preparation for enhanced oil recovery (EOR), desalting, water for production activities and/or hydrofracturing in whole or in part depending on the subsystems demands. For example, should the volume of produced water decrease or stop entirely, processing of water for the foregoing operations can continue.

In some embodiments, the processed water goes through a secondary treatment stage to allow for reuse in EOR, desalting, water for production activities and/or hydrofracturing. It should be appreciated that water used for EOR must be free of suspended solids, sulfates, oxygen, boron, barium and strontium. Additionally, a biocide is often added to prevent biological attack on any recovered oil. In some embodiments, the processed water goes through an additional treatment stage to allow for reuse in low total dissolved solids (TDS) EOR, desalting, water for production activities and/or hydrofracturing. It should be appreciated that water used for these operations must be free of various contaminated such as suspended solids, sulfates, oxygen, barium and strontium, and must have low TDS. Additionally, a biocide is often added to prevent biological attack on any recovered oil.

Preparation of water for use in EOR comprises nano filtration of the water stream. Nano filtration is accomplished using a low pressure nano filtration process with a membrane. Suitable membranes, e.g., reverse osmosis membrane elements designed to allow monovalent ions such as sodium and chloride to pass through as permeate, are designed specifically for the removal of large ions, typically divalent such as sulfates, hardness, barium and strontium. The membranes are run at low pressures and do not remove general TDS such as sodium and chloride.

In some embodiments, further filtration of the water is necessary prior to use in EOR, desalting and/or hydrofracturing, i.e., where low TDS water is required. In these embodiments, alternate forms of reverse osmosis filtration occur. Salinity removal from the water is accomplished using a high pressure, high rejection membrane designed for streams comprising monovalent ions such as sodium and chloride, e.g., high pressure reverse osmosis membrane elements, as described in greater detail infra. Where feasible, energy is recovered from the reverse osmosis brine stream and returned to the feed stream.

In addition to nano filtration, preparation for use of water in EOR, desalting or hydrofracturing comprises a degasification stage. A special membrane is used to remove oxygen from the water. The membrane is a hydrophobic thin film composite of polydimethysilicon (PDMS) on a polysulfone base. The membrane has a bubble point of approximately 300 psi. The membrane does not let water pass through, i.e., the membrane only allows gases to pass. Under typical operating conditions, the membrane can remove up to 99% of the oxygen in the feed stream, while operating at a feed pressure of 50-200 psi and temperature of up to 77° C. The combination of using a vacuum pump on the gas side of the membrane and nitrogen sweep gas causes the removal of $O_2$ to less than 50 parts per billion (PPB).

In some embodiments, the system comprises further oxygen removal from the water stream. Depending on the feed oxygen concentration and the desired removal efficiency, a polishing resin device can be used to further reduced oxygen in the water. The water is passed through a pressurized vessel at approximately 50-150 psi holding a weakly basic, macroporous, palladium-doped, polymer based resin in the form of spherical beads. The oxygen is catalytically removed from the water in the presence of a suitable reducing agent such as hydrogen. Hydrogen is introduced to the vessel under pressure and is dissolved in the water to be treated and then passed through the resin bed. Residual oxygen concentrations of less than 20 ppb can be obtained at flow rates up to a superficial velocity of 80 meters per hour at temperatures up to 120° C. Optionally, an oxygen removal agent such as hydrazine may be used for final polishing and removal of $O_2$.

In view of the foregoing, it should be appreciated that the present invention comprises groupings of elements into subsystems. The present invention broadly comprises the following grouped subsystems in various combinations: water cleaning; particle and oil removal; chemical oxygen demand reduction; heavy metal removal; and, water reuse.

Figure 2:
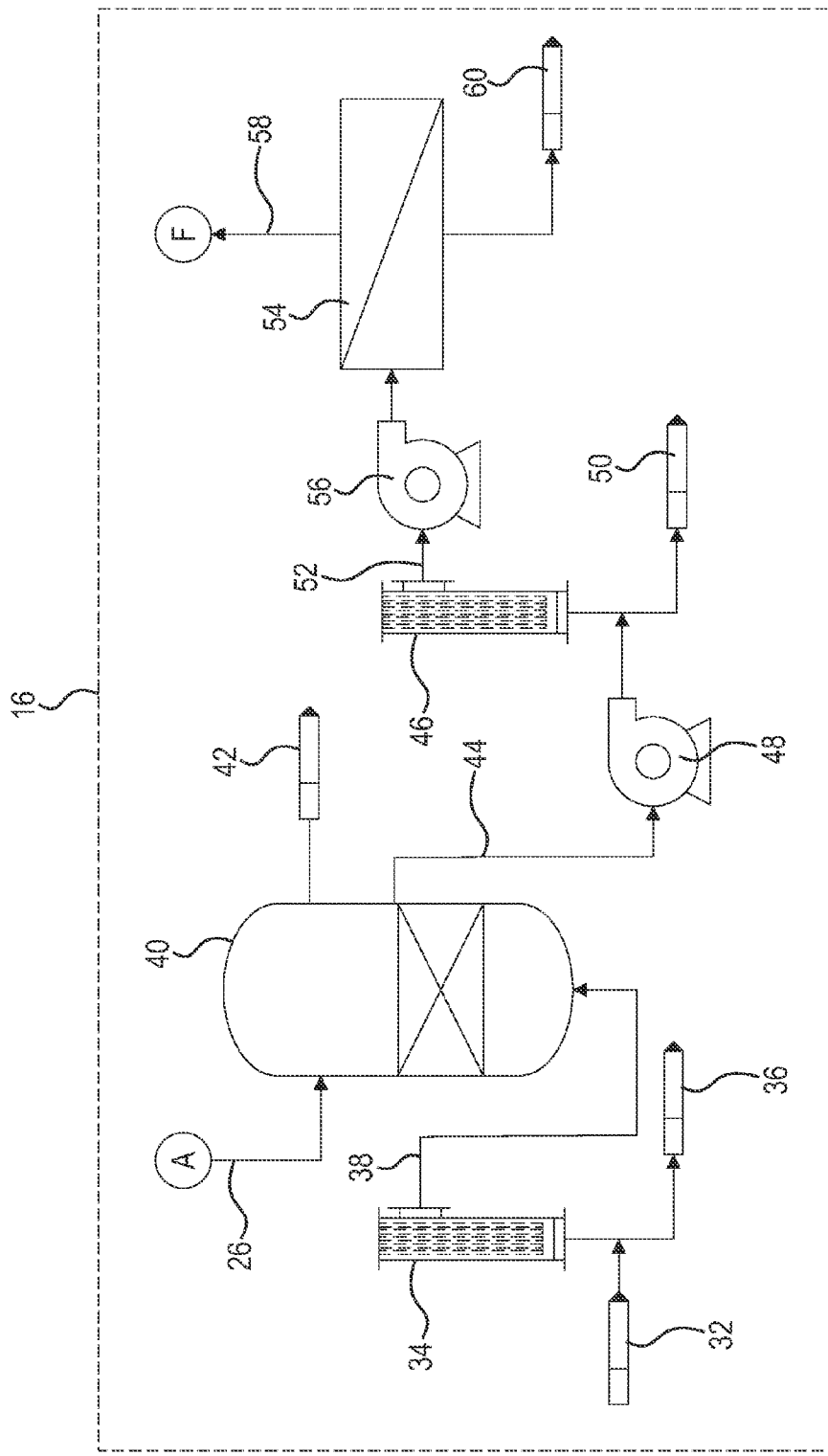
FIG. 2 is a second portion of a schematic diagram of a present invention system for treating produced water showing a particle and oil subsystem.
Figure 3:
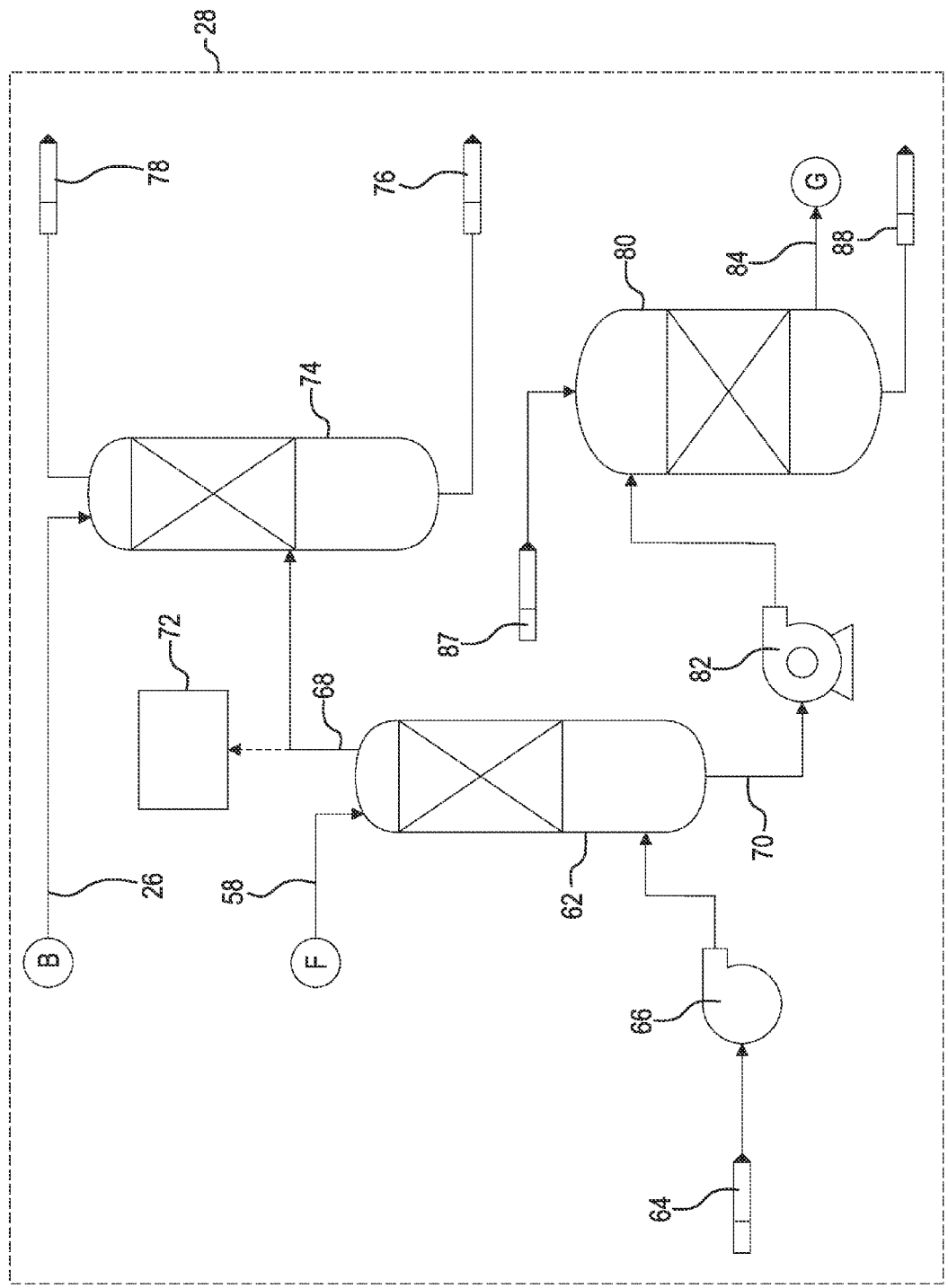
FIG. 3 is a first portion of a schematic diagram of a present invention system for treating produced water showing a chemical oxygen demand reduction subsystem.
Figure 4:
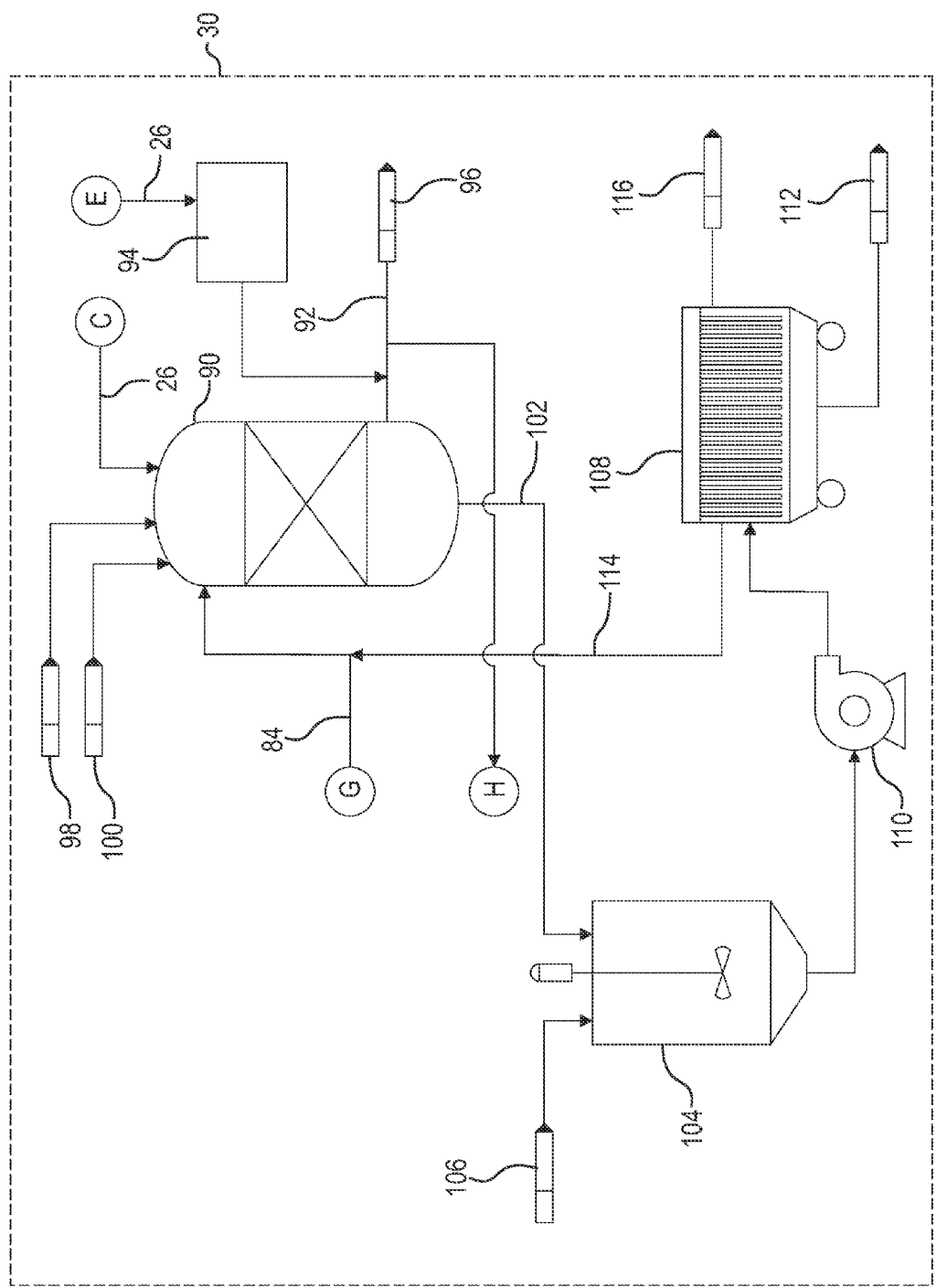
FIG. 4 is a first portion of a schematic diagram of a present invention system for treating produced water showing a heavy metal removal subsystem; and, FIG. 5 is a first portion of a schematic diagram of a present invention system for treating produced water showing a water reuse subsystem.
Figure 5:
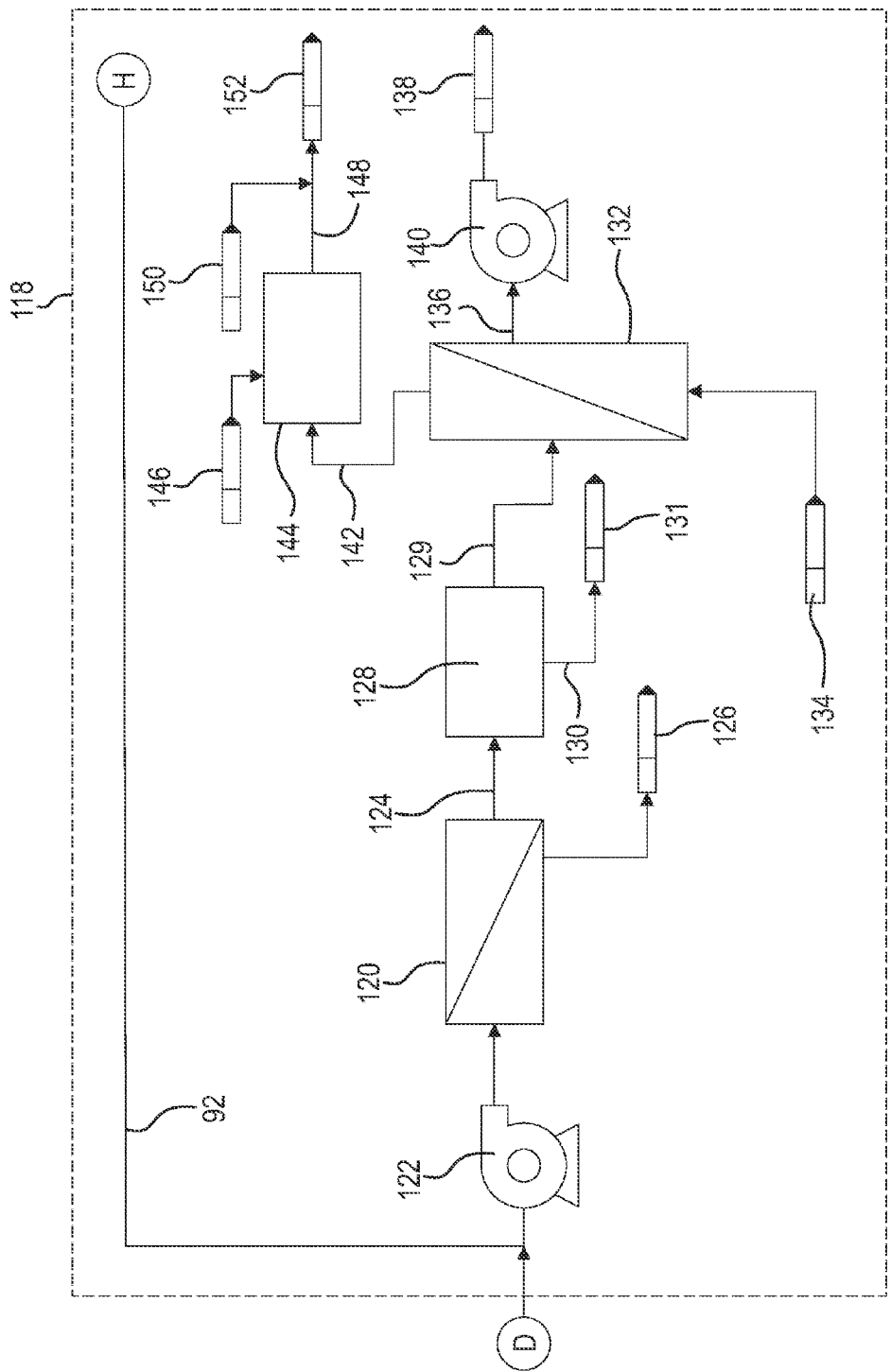

FIGS. 1 through 5 depict a typical embodiment of a present invention system for treating produced water. It should be noted that in order to depict the present invention with sufficient detail in the figures, the system was broken in to portions and distributed across FIGS. 1 through 5. The connections between the separate portions are represented by encircled letters. For example, one connection between FIG. 1 and FIG. 2 is shown by the encircled 'A'.

Water Cleaning Subsystem

Water cleaning subsystem 10 receives unconditioned cleaning water feed stream 12, e.g., ocean water or other water supply such as a fresh water, and passes water feed stream 12 through gross particle filter 14 thereby removing large particulate matter. In some embodiments, water feed stream 12 is pumped through water cleaning subsystem 10 as described infra relative to particle and oil removal subsystem 16. In some embodiments of the invention, gross particle filter 14 is a self-cleaning tubular backwash filter such as the strainers manufactured by SAMCO Technologies, Kinney, R P Adams, DOW Tequatic™ plus. Gross particle filter 14 is fitted with a 100-200 micron wedgewire filter element. Other filtration or solids liquid separation technologies may also be used for large particulate removal, such as a disc filter or centrifuge. Gross particle filter 14 is arranged to be backwashed with filtered water from the unit. The backwash wastewater is returned to the source of water feed stream 12, e.g., an ocean, via outlet 18.

Subsequently, gross filtered water stream 20 exits filter 14 and is passed through fine particle filter 22 wherein particulate matter with sizes ranging from 10-100 microns is removed. In some embodiments of the invention, fine particle filter 22 is a self-cleaning tubular backwash filter such as the tubular filter manufactured by SAMCO Technologies. Fine particle filter 22 is fitted with a 10-20 micron media which may be a Teflon®, polypropylene, nylon or metal cloth filter element. Other filtration or solids liquid separation technologies may be used for fine particulate removal, such as a disc filter, cartridge filter, or bag filter. Fine particle filter 22 is designed to be backwashed with filtered water from the unit. Pneumatic gas assist can be used to dislodge any sticky material from the filter surface. Air is compressed with line pressure into a dome on the device and expanded when the pressure is relieved during backwash. The backwash wastewater is returned to the source of water feed stream 12, e.g., an ocean, via outlet 24. The water stream exiting fine particle filter 22 is conditioned cleaning water feed stream 26 which, in some embodiments, is used in particle and oil removal subsystem 16, chemical oxygen demand reduction subsystem 28, heavy metal and dissolved ion removal subsystem 30, water reuse subsystem 118 and/or oxidizing agent feed stream 94. It should be appreciated that chemical and biological oxygen demand levels are reduced by a reduction or removal of hydrocarbons, volatile gases, non-volatile gases and $H_2S$, and that chemical oxygen demand reduction subsystem 28 is used to reduce or remove all or some of these contaminants.

Particle and Oil Removal Subsystem

Particle and oil removal subsystem 16 receives initial water feed stream 32 from a plant oil dehydrator, desalter (not shown) or other produced water generators such as flow back from a hydrofracturing operation. Feed stream 32 is pumped to gross particle filter 34 at a pressure of approximately 50 to 150 pounds per square inch gauge (psig) thereby removing large particulate matter. In some embodiments of the invention, gross particle filter 34 is a self-cleaning tubular backwash filter such as the strainers manufactured by SAMCO Technologies, Kinney, R P Adams, DOW Tequatic™ plus. Gross particle filter 34 is fitted with a 100-200 micron wedgewire filter element. Other filtration or solids liquid separation technologies may also be used for large particulate removal, such as a disc filter or centrifuge. Gross particle filter 34 is arranged to be backwashed with filtered water from the unit. The backwash wastewater is returned via outlet 36 to the dehydrator or stilling tank where solids and attached hydrocarbons settle out and can be removed as sludge or recovered. Depending on the nature of the solids, backwash wastewater may be sent back to precipitation unit 104, separated and the solids dewatered.

Filtered water 38 from gross particle filter 34 comprises very small oil droplets. Filtered water 38 flows to coalescer unit 40 for oil removal. Due to the small size of oil droplets, the oil will not separate from filtered water 38 in a traditional gravity separator without assistance. Coalescer unit 40 comprises a multi chamber vessel or pair of single chamber vessels, designed for either atmospheric or pressure operation. These units are custom designed for each application. A suitable coalescer unit can be obtained from SAMCO Technologies located in Buffalo, N.Y. The first chamber or vessel holds a bed of coalescing media. In some embodiments of the invention, the coalescing media is Amberlite™ ROC110 manufactured by Dow Chemical Company. The coalescing media attracts the very small oil droplets and allows them to agglomerate into larger oil droplets that then float to the top of the water in the second chamber or vessel, similar to a traditional gravity separator. The floating oil phase is returned to the dehydrator or other suitable collection device for recovery via outlet 42. Depending on the characteristics of filtered water 38 cleaning may be required. Fouling by contaminants such as particles and paraffin can occur. Removal of contaminants is accomplished by internal or external reverse flow/fluidizing of the coalescing media bed and/or hot water stripping of the media bed. Moreover, in some embodiments, coalescer unit 40 may require the use of additional water, i.e., conditioned cleaning water feed stream 26. It should be appreciated that recovery of oil in coalescer unit 40 may be as high as 95% with residual oil as low as 5 ppm in the water stream. In view of the efficiency of the resin separator system, the water exiting the separator can be directly discharged to the environment where conditions allow. However, it should be appreciated that whether the water is directly discharged or further processed is based on the quality of the feed stream and the discharge standards for the application or location.

Water feed 44 exiting the separating chamber or vessel of coalescer unit 40 is transferred to fine particle filter 46 at a pressure of approximately 50 to 150 psig using pump 48, if required, wherein particulate matter with sizes ranging from 10-100 microns is removed. In some embodiments of the invention, fine particle filter 46 is a self-cleaning tubular backwash filter such as the tubular filter manufactured by SAMCO Technologies. Fine particle filter 46 is fitted with a 10-50 micron media which may be a Teflon®, polypropylene, nylon or metal cloth filter element. Other filtration or solids liquid separation technologies may be used for fine particulate removal, such as a disc filter, cartridge filter, or bag filter. Fine particle filter 46 is designed to be backwashed with filtered water from the unit. The backwash wastewater is returned via outlet 50 to the dehydrator or stilling tank where solids settle out and can be removed as sludge. Fine particle filter 46 comprises a dome for trapping and compression of air to allow for pneumatic cleaning assist.

Water stream 52 exiting fine particle filter 46 may containing trace amounts of free and emulsified oil. Water stream 52 flows to oil removal membrane unit 54 for further removal of oil. In some embodiments, water stream 52 is transferred to membrane unit 54 using pump 56. It should be appreciated that depending system needs, only one of pumps 48 and 56 will be included, e.g., a single pump may be sized to be sufficient for the needs of the removal subsystem 16. Oil removal membrane unit 54 is an array of pressure rated housings filled with spiral wound or hollow fiber membrane modules, the number and arrangement of which are dictated by the water flow rate to yield a permeate water flow rate of 5-20 gallons/minute/square foot of membrane. In some embodiments of the invention, the membrane elements are hydrophilic polyacrylonitrile (PAN) polymer, PVDF, or PVC. A suitable example of a membrane element is General Electric's MW Series membrane. Feed water is pressurized to approximately 100-300 psi prior to entering the membrane array. Water, dissolved ionic species, and small molecular weight hydrocarbons below approximately 50K Dalton and approximately 0.01 micron cutoff pass through the membrane and are collected as permeate stream 58 resulting in 85% or more of the volume of the feed water entering the unit. The remaining water and higher molecular weight above 50K Dalton molecular weight hydrocarbons are substantially rejected by the membrane and returned via outlet 60 to the dehydrator for oil recovery. As oil concentrates in the membrane separator, the oil adsorbs BETX compounds thus reducing the COD and BOD in the water.

If the membrane requires cleaning, hot water and/or caustic compounds may be flushed through the membranes or externally clean the membranes in place within system.

Chemical Oxygen Demand (COD) and Biological Oxygen Demand (BOD) Reduction Subsystem Chemical oxygen demand reduction subsystem 28 receives low pressure permeate stream 58 from oil removal membrane unit 54 which stream 58 flows to stripping unit 62 for removal of volatile organic compounds (VOC) and hydrogen sulfide ($H_2S$) to reduce chemical oxygen demand (COD) of the water. Stripping unit 62 is a conventional countercurrent gas/liquid contacting tower filled with random or structured packing well known to those skilled in the art, e.g., Jaeger Tri-Packs® or a low profile tray type. Water stream 58, rich in VOC and $H_2S$, enters the top of stripping unit 62 and flows downward through the packing or trays. Clean atmospheric air stream 64 is introduced into the bottom of stripping unit 62 via blower 66 and flows upwardly. As water stream 58 contacts air stream 64, VOC and $H_2S$ transfer from the liquid phase to the gas phase yielding vapor phase stream 68 rich in VOC and $H_2S$. Vapor phase stream 68 exits the top of the unit, i.e., stripping unit 62, and water stream 70, lean in VOC and $H_2S$, exits the bottom of the unit, i.e., stripping unit 62. An example of a suitable stripping unit 62 is a convention tower type stripping unit such as the stripping unit sold by Delta Cooling Towers, inc. located in Rockaway, N.J., or the shallow tray compact type sold by Bisco Environmental located in Taunton, Mass.

In some embodiments of the invention, the VOC and $H_2S$ rich vapor phase, i.e., vapor phase stream 68, flows to gas flare 72. Gas flare 72 is also commonly known in the art as a flare and a flare stack, and may, in some embodiments, be a thermal oxidizer. In some embodiments of the invention, vapor phase stream 68 flows to bio scrubber unit 74 for treatment, e.g., reducing carbon content, to allow discharge to atmosphere meeting regulatory limits. In some embodiments of the invention, bio scrubber unit 74 is a conventional contacting tower filled with BioVast™ or MP2C, a porous, hydrophilic, high surface area flow through ceramic packing manufactured by CerMedia™ LLC located in Buffalo, N.Y. The media provides high surface area and flow throughput for the air, which provides increased contact with microorganisms that are generally indigenous to the region where the unit resides and may include any species of heterotrophic bacteria that inoculate the media and adapt to destroy, in an aerobic process, VOCs and $H_2S$. Biofilters are reactors in which waste gases are allowed to pass through a porous packed bed material immobilized with suitable microbial cultures. As the waste gas passes through the filter medium, the contaminants in the gas transverse to the liquid phase surrounding the microbial biofilm in the medium where they are degrade to $CO_2$, $H_2O$, $SO_4$, inorganic salts and biomass by microorganisms. The high surface area of the media permits the unit to have a small overall footprint and low weight.

Conditioned cleaning water stream 26, obtained from an ocean or other available clean water source as described supra, is trickled across the top of the packing material for humidity and water wetting control. Water stream 26 is sprayed over the packing material at a rate necessary to maintain saturated packing material while flushing away treated byproducts. Packing material size is selected to cause an empty bed contact of between 5-60 seconds. VOC and $H_2S$ rich vapor, i.e., vapor phase stream 68, flows into the bottom of the tower of bio scrubber unit 74 and upwardly through the packing material. The preferred packing material is a very porous ceramic media which has extremely high surface area. The surface of the packing material is covered with a biofilm of naturally occurring microorganisms that metabolize VOCs and $H_2S$ to carbon dioxide, water, and sulfates which can be safely discharged to the atmosphere or ocean. There are many types of naturally occurring bacteria that provide biochemical destruction of VOCs and $H_2S$. Examples include but are not limited to chemoheterotophic bacteria and sulfur oxidizing bacteria. Water stream 76 is discharged to an ocean or other suitable discharge location and treated air stream 78 is discharged to the atmosphere.

Water stream 70, which exits from the bottom of stripping unit 62, flows to hydrocarbon polishing unit 80 for removal of dissolved, non-volatile organic compounds, e.g., phenols and polycyclic aromatic hydrocarbons (PHA), to recover additional hydrocarbons and to further reduce COD of water stream 70 to make it suitable for disposal or reuse. In some embodiments, water stream 70 is transferred to polishing unit 80 using pump 82. In some embodiments of the invention, hydrocarbon polishing unit 80 comprises two standard ASME pressure vessels filled with synthetic adsorbent resin. The pressure vessels may be arranged in various series and parallel configurations. An example of a suitable synthetic adsorbent resin is the styrene-DVB macroporous material Dowex™ Optipore™ L493 manufactured by Dow Chemical Company located in Midland, Mich. Other adsorptive media such as activated carbon, e.g., activated carbon sold by Calgon Carbon located in Pittsburgh, Pa., may be utilized in hydrocarbon polishing unit 80. During normal service, the vessels that form hydrocarbon polishing unit 80 are arranged in series or parallel with the first vessel removing the largest portion, and possibly all, of the COD load from water stream 70, with the second vessel acting as a polishing unit for any trace materials passing through the first vessel. As water stream 70 flows through the adsorbent, i.e., synthetic adsorbent resin, dissolved non-volatile organic compounds transfer to and are bound to active sites on the adsorbent surface while treated water stream 84, having COD levels meeting discharge limits, exits hydrocarbon polishing unit 80 via outlet 88.

In some embodiments of the invention, the synthetic adsorbent resin used in hydrocarbon polishing unit 80 can be regenerated. During a regeneration event, one vessel remains online treating water stream 70 while the other vessel is regenerated. The vessel to be regenerated is taken offline and the saturated synthetic adsorbent resin is contacted with 50-150 psig steam 87 to desorb the bound organics. Vapor containing the desorbed organic material exits the vessel being regenerated and is then condensed and recycled to the dehydrator for recovery via outlet 88. It should be appreciated that in some embodiments, all hydrocarbons are recovered in polishing unit 80 thereby eliminating the need to include stripping unit 62, gas flare 72 and bio filter scrubber unit 74.

Heavy Metals and Dissolved Ion Removal Subsystem

Heavy metals removal subsystem 30 receives water stream 84 exiting hydrocarbon polishing unit 80 contains dissolved heavy metal ions, such as lead, copper, cadmium, mercury, barium and strontium, and other ions such as boron which must be removed to a level suitable for discharge, e.g., discharge in an ocean. In some embodiments of the invention, heavy metals and dissolved ion removal unit 90 comprises two standard ASME pressure vessels filled with ion exchange resin such as Amberlite™ IRA748, Ambersep™ GT74 or Amberlite™ IRA743 (for boron removal), all sold by Dow Chemical Company located in Midland, Mich.

Other ion exchange resins may be used, i.e., ion exchange resins designed for selective removal of trace metal compounds from high salinity solutions. During normal service, the vessels are arranged in series with the first vessel removing the largest portion, and possibly all, of the heavy metals and/or dissolved ions load from water stream 84 with the second vessel acting as a polishing unit for any trace material passing through the first vessel. It should be appreciated that vessels may also be arranged in parallel depending on the needs of the system, spatial constraints, etc. As water stream 84 flows through the ion exchange resin bed, dissolved heavy metal ions and other dissolved ions transfer to and are bound to active sites on the adsorbent surface of the ion exchange resin material while treated water stream 92, having contaminant levels meeting discharge limits, exits heavy metals and dissolved ion removal unit 90. Treated water stream 92 is blended with oxidizing agent feed stream 94, which may include oxidizing agents such as chlorine, ozone or hydrogen peroxide, for trace COD removal and $H_2S$ destruction, after which treated water stream 92 is discharged, e.g., discharged to an ocean via outlet 96. Alternatively, treated water stream 92 can be further treated for use in the water recovery stream for enhanced oil recovery (EOR), desalting and hydrofracturing operations as described infra.

In some embodiments of the invention, the ion exchange resin used in heavy metals and dissolved ion removal unit 90 can be regenerated. During a regeneration event, one vessel remains online treating water stream 84 while the other vessel is being regenerated. The vessel to be regenerated is taken offline and saturated ion exchange resin is contacted with concentrated acidic stream 98, e.g., sulfuric or hydrochloric acid, to desorb the heavy metals and other dissolved ions such as boron. The ion exchange resin is then contacted with concentrated basic stream 100, e.g., sodium hydroxide, to restore exchange capacity to the ion exchange resin. Some resins, e.g., Ambersep™ GT74, do not require the sodium hydroxide restoration step.

Regeneration solutions stream 102 exiting the ion exchanged resin bed of heavy metals and dissolved ion removal unit 90 is rich in heavy metals, and is collected for subsequent processing in heavy metals and dissolved ion precipitation unit 104. Concentrated basic stream 106, e.g., sodium hydroxide or calcium hydroxide (lime), is added to regeneration solutions stream 102 to adjust the pH of stream 102 to the appropriate range for heavy metal precipitation as insoluble metal hydroxides. In some embodiments of the invention, the metal hydroxide precipitate and dissolved ion precipitate is transferred from precipitation unit 104 to filter press 108 using pump 110. The metal hydroxide precipitate is filtered from regeneration solutions stream 102 using filter press 108, i.e., a standard filter press well known to those skilled in the art. Alternative solid/liquid separating devices, such as a centrifuge, may also be used. Precipitated solids cake 112 are collected for offsite disposal. Filtrate stream 114 is recycled to heavy metals and dissolved ion removal unit 90 while final filtered waste water stream 116 may be returned to the dehydrator or discharged.

Water Reuse Subsystem

In many applications it is advantageous to utilize produced water as a supply for EOR and other production operations. For EOR operations, pressurized water is injected into an oil reservoir to increase reservoir pressure and oil output. Water used for this purpose must have low concentrations of sulfate, salts contributing to hardness, metals, boron, TDS and oxygen which otherwise would degrade the oil or yield high concentration of $H_2S$, react with down hole chemistry, or plug the oil recovery collection system in recovered oil or natural gas. In some embodiments, water reuse subsystem 118 is used to prepare water for subsequent EOR operations, hydrofracturing or other production activities. It should be appreciated that "TDS" is intended to include but not be limited to salts that contribute to water hardness.

In some embodiments of the invention, water stream 92 exiting heavy metals and dissolved ion removal unit 90 flows to sulfate and hardness removal membrane unit 120. Sulfate and hardness removal membrane unit 120 comprises an array of pressure rated housings filled with spiral wound nanofiltration membrane modules, the number and arrangement of which are dictated by the flowrate of water stream 92 needed to yield a permeate water flowrate of 10-15 gallons/minute/square foot of membrane. In some embodiments of the invention, the membrane elements are Filmtec™ SR90 sold by Dow Chemical Company located in Midland, Mich. Water stream 92 is pressurized to 100-300 psi prior to entering the membrane array of sulfate and hardness removal membrane unit 120 using pump 122. Water and some dissolved ionic species, namely sodium and chloride ions, pass through the membrane and are collected as permeate water stream 124 amounting to 75-85% volume of water stream 92 entering unit 120. The remaining water and higher molecular weight ions, e.g., divalents such as sulfate and hardness, are rejected by the membrane array and are discharged to the ocean via outlet 126.

In some embodiments, low TDS water is required for various operations, e.g., EOR, desalting and/or hydrofracturing. As described above, low TDS water is produced using high pressure, high rejection reverse osmosis membranes. In these embodiments, permeate water stream 124 flows to TDS removal unit 128. TDS removal unit 128 comprises high pressure, high rejection reverse osmosis membrane elements, e.g., Filmtec™ SW30 sold by Dow Chemical located in Midland, Mich. Permeate water stream 124 is pressurized to 700-1500 psi prior to entering the membrane array by a high pressure pump integral to or incorporated within TDS removal unit 128. The membrane rejects low weight ionic compounds like sodium and chloride. Water stream 129, i.e., water collected from permeate water stream 124, amounts to 30-70% volume of the feed water entering TDS removal unit 128. The remaining water and lower molecular weight ions such as sodium, i.e., waste stream 130, the material rejected by the membranes, are discharged to the ocean or other suitable receiving body via outlet 131. Where feasible, the high pressure, i.e., energy, of waste stream 130 can be recovered using an energy recovery device and returned to the feed stream through reduction of power to the main feed pump. Suitable energy recovery units include but are not limited to work exchangers and turbines, e.g., DWEER™ and Calder ERT sold by Flowserve located in Irving, Tex.

After sulfate removal, permeate water stream 129 flows to oxygen removal unit 132. Oxygen removal unit 132 comprises an array of pressure rated housings filled with gas permeable hollow fibers or spiral wound, the number and arrangement of which are dictated by the flowrate of water stream 129 needed to maintain pressure loss at less than 25 psi and to reduce oxygen concentration from saturation to less than 50-100 PPB. In some embodiments of the invention, the membrane elements are Liqui-Cel membrane contactors as sold by Membrana located in Wuppertal, Germany, or alternatively, may be MDS-325O2 as sold by Membrane Development Specialist located in Solana, Calif. It has been found that the spiral wound configuration of MDS-325O2 is easily cleaned. A booster pump integral to or incorporated within oxygen removal unit 132 boosts water stream 129 to 50-150 psi prior to entering the membrane array. Water and dissolved gases, namely oxygen, flow through the shell side of the contactor. A liquid ring vacuum pump pulls a 50 tor vacuum on the tube side to drive gas transfer from the liquid to the gas phase across the membrane. Additionally, nitrogen gas stream 134 from a pressure or thermal swing nitrogen generator flows through the hollow fibers to lower oxygen partial pressure and further drive oxygen from the liquid phase to the gas phase. Sweep gas stream 136 is discharged to atmosphere 138 via vacuum pump 140.

Deoxygenated water stream 142 may be further polished with the use of an catalytic reaction in pressurized vessel 144. As described supra, pressurized vessel 144 is filled with a palladium-doped resin. Deoxygenated water stream 142 receives pressurized hydrogen stream 146 which is dissolved therein. Subsequently, the water stream passes through the resin bed and exits as deoxygenated water stream 148. Suitable resins include Lewatit® K 3433 (a crosslinked polystyrene resin with tertiary amine functional groups) sold by Lenntech by located in Rotterdam, Netherlands. It should be appreciated that in some embodiments, oxygen may be removed from feed water 129 by using an ion exchange resin.

Deoxygenated water stream 148, which may be blended with oxygen scavenger stream 150 such as hydrazine to further reduce dissolved oxygen concentration below 5 PPB, is then sent to EOR injection equipment for subsequent use via outlet 152.

The present invention provides: hydrocarbon recovery; compact layout; light weight overall structure; minimum chemical use; and, minimum waste generation. Unique aspects of the present invention include but are not limited to: use of a resin for oil removal in conjunction with a membrane; use of small foot print filters staged around the resin unit; an air striper with bio filter for volatile organic compounds and $H_2S$ removal; an air striper with COD resin trap; a heavy metals removal unit in place of conventional precipitation; blending with a sea, fresh or treated water waste stream; water conditioned for use in hydrofracturing, desalting and EOR having high or low TDS; use of degasification membranes; and, degasification membranes in combination with resin degasification.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A system adapted to condition an initial water feed stream into a treated water stream and to discharge the treated water stream, the initial water feed stream comprising at least one of: a plurality of particles; an oil; a volatile organic compound; a hydrogen sulfide; a non-volatile organic compound; a heavy metal; and, a dissolved ion, the system comprising:
    a particle and oil removal subsystem adapted to treat the initial water feed stream to remove the plurality of particles and the oil to form a first partial treated water stream, the particle and oil removal subsystem comprises an oil coalescer unit and an oil removal membrane unit each adapted to treat the initial water feed stream to remove the oil, wherein the oil is recoverable, wherein
        the oil coalescer unit comprises a catalytic resin bead packing and outputs a coalescer water stream and an oil stream, the oil stream is recovered for subsequent use,
        the oil removal membrane unit comprises a hydrophilic filter membrane and is arranged to receive the coalescer water stream and output the first partial treated water stream; and,
    a gas/liquid contacting unit adapted to treat the first partial treated water stream to strip the volatile organic compound and the hydrogen sulfide to form a second partial treated water stream and to form a vapor phase stream comprising the volatile organic compound and the hydrogen sulfide.

2. The system of claim 1 wherein the particle and oil removal subsystem further comprises at least one of: a gross particle filter adapted to treat the initial water feed stream to remove the plurality of particles; and, a fine particle filter adapted to treat the initial water feed stream to remove the plurality of particles.

3. The system of claim 1 further comprising a hydrocarbon polishing unit adapted to treat the first partial treated water stream to remove the non-volatile organic compound.

4. The system of claim 1 wherein the gas/liquid contacting unit is a stripping unit and the system further comprises at least one of: a bio scrubber unit adapted to metabolize the volatile organic compound and the hydrogen sulfide of the vapor phase stream; and, a flare or a thermal oxidizer adapted to combust the volatile organic compound and the hydrogen sulfide of the vapor phase stream.

5. The system of claim 1 further comprising a heavy metal and dissolved ion removal subsystem adapted to treat the second partial treated water stream to remove the heavy metal and the dissolved ion to form the treated water stream, wherein the heavy metal and dissolved ion removal subsystem comprises at least one of: a heavy metal and dissolved ion removal unit adapted to treat the second partial treated water stream to adsorb the heavy metal and the dissolved ion and to form a plurality of adsorbed heavy metals and a plurality of adsorbed dissolved ions; a heavy metal and dissolved ion precipitation unit adapted to precipitate the plurality of adsorbed heavy metals as a plurality of insoluble metal hydroxides and the plurality of adsorbed dissolved ions as a plurality of insoluble compounds; and, a filter press adapted to form at least one cake comprising the plurality of insoluble metal hydroxides and the plurality of insoluble compounds.

6. The system of claim 1 further adapted to prepare the treated water stream for an enhanced oil recovery operation, the treated water stream comprising at least one of: a sulfate; a hardness; a dissolved solid; and, an oxygen, the system further comprising:
    a water reuse subsystem adapted to treat the treated water stream to remove the sulfate, the hardness; the dissolved solid and/or the oxygen to form an enhanced oil recovery feed stream.

7. The system of claim 6 wherein the water reuse subsystem comprises at least one of: a sulfate and hardness removal membrane unit adapted to treat the treated water stream to remove the sulfate and the hardness; a high pressure reverse osmosis unit adapted to treat the treated water stream to remove the dissolved solids; a first oxygen removal unit adapted to treat the treated water stream to remove the oxygen; a second oxygen removal unit adapted to treat the treated water stream to catalytically remove the oxygen; and, an oxygen scavenger feeder adapted to blend an oxygen scavenger and the treated water stream.

8. The system of claim 1 further comprising:
a water cleaning subsystem adapted to treat an unconditioned cleaning water feed stream to remove a plurality of particles to form a conditioned cleaning water feed stream, wherein the conditioned cleaning water feed stream is used by the particle and oil removal subsystem.

9. The system of claim 8 wherein the water cleaning subsystem comprises at least one of: a gross particle filter adapted to treat the unconditioned cleaning water feed stream to remove the plurality of particles; and, a fine particle filter adapted to treat the unconditioned cleaning water feed stream to remove the plurality of particles.

10. The system of claim 8 wherein the unconditioned cleaning water feed stream comprises ocean water or a fresh water source.

11. A method for conditioning an initial water feed stream into a treated water stream, the initial water feed stream comprising at least one of: a plurality of particles; an oil; a volatile organic compound; a hydrogen sulfide; a non-volatile organic compound; a heavy metal; and, a dissolved ion, the method comprising:
a) treating the initial water feed stream to remove the plurality of particles and the oil to form a first partial treated water stream, wherein the step of treating the initial water feed stream is performed using an oil coalescer unit and an oil removal membrane unit each adapted to treat the initial water feed stream to remove the oil and the oil is recoverable, wherein
the oil coalescer unit comprises a catalytic resin bead packing and outputs a coalescer water stream and an oil stream, the oil stream is recovered for subsequent use,
the oil removal membrane unit comprises a hydrophilic filter membrane and is arranged to receive the coalescer water stream and output the first partial treated water stream; and,
b) treating the first partial treated water stream to remove the volatile organic compound, the hydrogen sulfide, the heavy metal and/or the dissolved ion to form a second partial treated water stream, wherein the step of treating the first partial treated water stream is performed using a gas/liquid contacting unit adapted to treat the first partial treated water stream to strip the volatile organic compound and the hydrogen sulfide to form the second partial treated water stream and to form a vapor phase stream comprising the volatile organic compound and the hydrogen sulfide.

12. The method of claim 11 wherein the step of treating the produced water feed stream is further performed using at least one of: a gross particle filter adapted to treat the initial water feed stream to remove the plurality of particles; and, a fine particle filter adapted to treat the initial water feed stream to remove the plurality of particles.

13. The method of claim 11 wherein the step of treating the first partial treated water stream is further performed using hydrocarbon polishing unit adapted to treat the first partial treated water stream to remove the non-volatile organic compound.

14. The method of claim 11 wherein the gas/liquid contacting unit is a stripping unit and the step of treating the first partial treated water stream is performed using the stripping unit and at least one of: a bio scrubber unit adapted to metabolize the volatile organic compound and the hydrogen sulfide of the vapor phase; and, a flare or a thermal oxidizer adapted to combust the volatile organic compound and the hydrogen sulfide of the vapor phase.

15. The method of claim 11 further comprising:
c) treating the second partial treated water stream to remove the heavy metal to form the treated water stream, wherein the step of treating the second partial treated water stream is performed using at least one of: a heavy metal and dissolved ion removal unit adapted to treat the second partial treated water stream to adsorb the heavy metal and the dissolved ion and to form a plurality of adsorbed heavy metals and a plurality of adsorbed dissolved ions; a heavy metal and dissolved ion precipitation unit adapted to precipitate the plurality of adsorbed heavy metals as a plurality of insoluble metal hydroxides and the plurality of adsorbed dissolved ions as a plurality of insoluble compounds; and, a filter press adapted to form at least one cake comprising the plurality of insoluble metal hydroxides and the plurality of insoluble compounds.

16. The method of claim 11 wherein the treated water stream comprises at least one of: a sulfate; a hardness; a dissolved solid; and, an oxygen, the method further comprising:
d) treating the treated water stream to remove the sulfate, the hardness, the dissolved solid and/or the oxygen to form an enhanced oil recovery feed stream.

17. The method of claim 16 wherein the step of treating the treated water stream is performed using at least one of: a sulfate and hardness removal membrane unit adapted to treat the treated water stream to remove the sulfate and the hardness; a high pressure reverse osmosis unit adapted to treat the treated water stream to remove the dissolved solids; a first oxygen removal unit adapted to treat the treated water stream to remove the oxygen; a second oxygen removal unit adapted to treat the treated water stream to catalytically remove the oxygen; and, an oxygen scavenger feeder adapted to blend an oxygen scavenger and the treated water stream.

18. The method of claim 11 further comprising: treating an unconditioned cleaning water feed stream to remove a plurality of particles to form a conditioned cleaning water feed stream, wherein the conditioned cleaning water feed stream is used in step a).

19. The method of claim 18 wherein the step of treating an unconditioned cleaning water feed stream is performed using at least one of: a gross particle filter adapted to treat the unconditioned cleaning water feed stream to remove the plurality of particles; and, a fine particle filter adapted to treat the unconditioned cleaning water feed stream to remove the plurality of particles.

20. The method of claim 18 wherein the unconditioned cleaning water feed stream comprises ocean water or a fresh water source.

21. The method of claim 11 wherein the oil concentrates in the hydrophilic filter membrane thereby adsorbing BTEX compounds and reducing COD and BOD in the first partial treated water stream.

22. A system adapted to condition an initial water feed stream into a treated water stream and to discharge the treated water stream, the initial water feed stream comprising at least one of: a plurality of particles; an oil; a volatile organic compound; a hydrogen sulfide; a non-volatile organic compound; a heavy metal; and, a dissolved ion, the system comprising:
a particle and oil removal subsystem adapted to treat the initial water feed stream to remove the plurality of particles and the oil to form a first partial treated water stream, the particle and oil removal subsystem comprises an oil coalescer unit and an oil removal membrane unit each adapted to treat the initial water feed stream to remove the oil, wherein the oil is recoverable, wherein the oil coalescer unit comprises a catalytic resin bead packing and outputs a coalescer water stream and an oil stream, the oil stream is recovered for subsequent use, and the oil removal membrane unit comprises a hydrophilic filter membrane and is arranged to receive the coalescer water stream and output the first partial treated water stream;

a gas/liquid contacting unit adapted to treat the first partial treated water stream to strip the volatile organic compound and the hydrogen sulfide to form a second partial treated water stream and to form a vapor phase stream comprising the volatile organic compound and the hydrogen sulfide; and, a bio scrubber unit adapted to metabolize the volatile organic compound and the hydrogen sulfide of the vapor phase stream.

23. The system of claim 22 wherein at least 1,000 PPM of the oil is present within the oil removal membrane unit.

24. The system of claim 22 wherein the bio scrubber unit comprises a hydrophilic, high surface area flow through ceramic media.

25. The system of claim 24 wherein the ceramic media comprises aerobic bacteria.

26. The system of claim 22 wherein the oil coalescer unit comprises a multi chamber vessel or a pair of single chamber vessels.

27. The system of claim 22 wherein the oil coalescer unit is adapted for removal of contaminants by reverse flow/fluidizing of the catalytic resin bead packing.

28. The system of claim 22 wherein the gas/liquid contacting unit is a counter current liquid down, gas up flow type unit comprising at least one of: a packing material; or, a series of trays.

29. A system adapted to condition an initial water feed stream into a treated water stream and to discharge the treated water stream, the initial water feed stream comprising at least one of: a plurality of particles; an oil; a volatile organic compound; a hydrogen sulfide; a non-volatile organic compound; a heavy metal; and, a dissolved ion, the system comprising:

a particle and oil removal subsystem adapted to treat the initial water feed stream to remove the plurality of particles and the oil to form a first partial treated water stream, the particle and oil removal subsystem comprises an oil coalescer unit and an oil removal membrane unit each adapted to treat the initial water feed stream to remove the oil, wherein the oil is recoverable, wherein the oil coalescer unit comprises a catalytic resin bead packing and outputs a coalescer water stream and an oil stream, the oil stream is recovered for subsequent use, and the oil removal membrane unit comprises a hydrophilic filter membrane and is arranged to receive the coalescer water stream and output the first partial treated water stream;

a gas/liquid contacting unit adapted to treat the first partial treated water stream to strip the volatile organic compound and the hydrogen sulfide to form a second partial treated water stream and to form a vapor phase stream comprising the volatile organic compound and the hydrogen sulfide; and, a flare or a thermal oxidizer adapted to combust the volatile organic compound and the hydrogen sulfide of the vapor phase stream.

* * * * *